March 3, 1959   J. E. POORMAN   2,875,662
CROSS-SLIDE FORM TOOL HOLDER
Filed April 18, 1956   3 Sheets-Sheet 1

INVENTOR
John E. Poorman.

BY
ATTORNEY

March 3, 1959  J. E. POORMAN  2,875,662
CROSS-SLIDE FORM TOOL HOLDER
Filed April 18, 1956  3 Sheets-Sheet 2
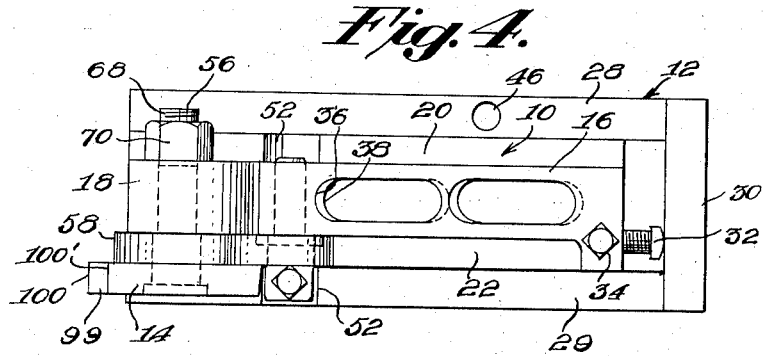
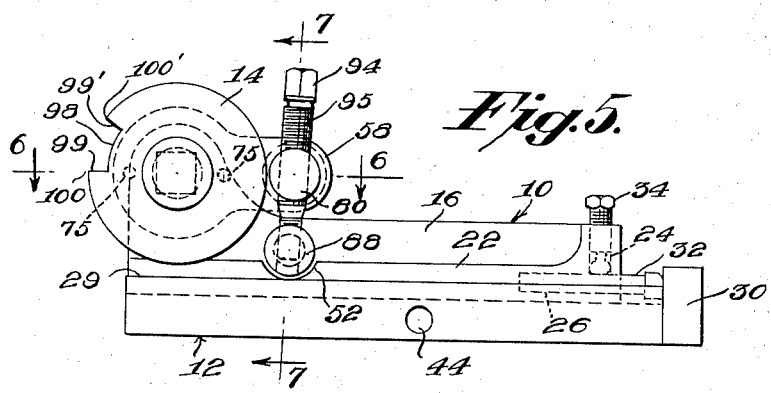
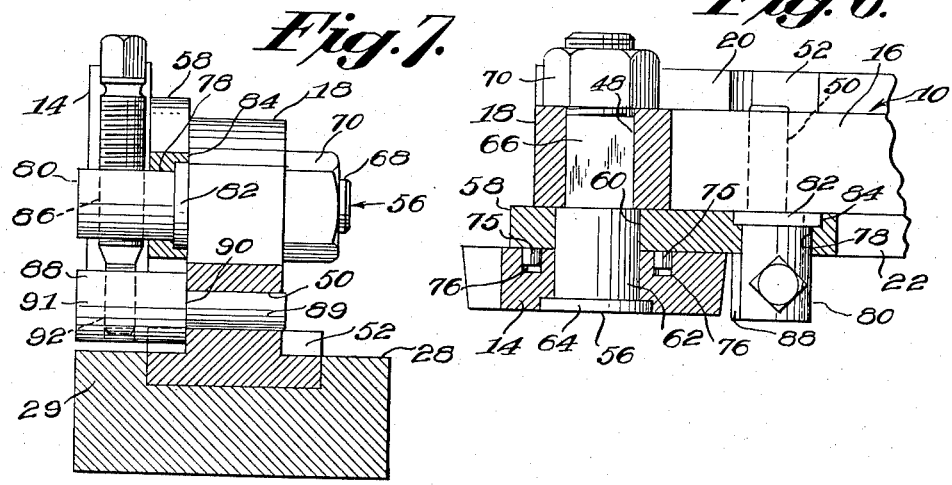
INVENTOR
John E. Poorman,
BY
ATTORNEY March 3, 1959

J. E. POORMAN 2,875,662

CROSS-SLIDE FORM TOOL HOLDER

Filed April 18, 1956

INVENTOR
John E. Poorman.

BY
ATTORNEY

2,875,662
CROSS-SLIDE FORM TOOL HOLDER

John E. Poorman, Philadelphia, Pa., assignor to J. E. Poorman, Inc., Philadelphia, Pa.

Application April 18, 1956, Serial No. 579,024

2 Claims. (Cl. 82—36)

This invention relates to machine tools and holders therefor, and more particularly to form tools and form tool holders and especially to holders adapted for use on cross-slides of automatic, multispindle machines.

Tool holders for circular tools such as form tools, as presently provided on the market, have several drawbacks or deficiencies. Included among these defects are, primarily, an inability to readily obtain an accurate adjustment of the tool and to maintain such adjustment. Another big drawback in present day tool holders resides in the fact that the tool supporting arbor and holder are subjected to excess torque which is compensated solely by friction. Finally, present day form tool holders lack the ability of universatility of supporting the tool in various positions.

Having in mind the defects of the prior art apparatus, it is an object of the present invention to provide a tool holder, especially for form tools and other circular tools, capable of ready and accurate adjustment of a tool supported thereby.

It is another object of the invention to provide a tool holder, especially for circular tools such as form tools, which are capable of resisting and reducing torque on the tool and tool supporting arbor.

It is a further object of the invention to provide a tool holder, especially for form tools or the like, capable of universatility of tool support.

It is still another object of the invention to provide a tool holder and support means therefor adapted for ready mounting on the cross-slide of an automatic multispindle machine.

It is a still further object of the invention to provide a form tool having universatility of use.

It is yet another object of the invention to provide a tool holder and form tool or the like having ready adjustability and universatility of positioning of the tool.

It is yet a further object of the invention to provide a tool holder, particularly for form tools, having simplicity of design, economy of construction and efficiency in operation.

Briefly, a tool holder in accordance with the present invention, comprises a stock including an elongated, rectangular base portion with an upstanding support portion at its front end. At its rear end, the stock is provided with a longitudinally extending bore for threadedly receiving an adjustment screw and a second bore opening through the top and intercepting said longitudinal bore for receiving a set screw engageable with the adjustment screw. A channel like bed, open at the front end and closed across the rear end, snugly receives the base portion of the stock with the adjustment screw abutting the closed end and both the stock and bed are provided with registering, vertical, longitudinal slots for bolting to the carriage of a cross-slide. The bed is also provided with vertical and horizontal bores for threadedly receiving positioning elements on the machine.

The stock support portion is provided with a cross-bore, preferably of square section, and the base portion has a cylindrical cross-bore. An arbor having a flanged cylindrical portion at one end, a threaded portion at the other and an intermediate portion of square section is mounted in the square bore with an arm and a tool mounted on the cylindrical portion and drawn against the side of the stock by the flange and a nut on the threaded portion, suitable clutch means being provided between the arm and tool. The arm has a cylindrical bore spaced from the arbor and a flanged stud is journaled in this bore. A second stud having an intermediate shoulder is journaled in the stock cylindrical cross-bore and a screw having oppositely threaded portions spans the two studs for adjusting the angle of the arm and tool relative to the arbor and stock. The squared shank and bore reduces torque on the tool and its arbor, and the arbor and second stud are insertable from either side of the stock, the tool preferably comprising a form tool with a peripheral notch having radial ends to provide two tool edges for use respectively on opposite sides of the stock.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts through the several figures and in which:

Fig. 4 is a top plan view of the holder and tool as shown in Fig. 3;

Fig. 5 is a side view in elevation of the holder and tool as shown in Figs. 3 and 4;

Fig. 6 is an enlarged cross-sectional view corresponding to the plane of line 6—6 of Fig. 5;

Fig. 7 is an enlarged cross-sectional view corresponding to the plane of line 7—7 of Fig. 5.

Figure 1:
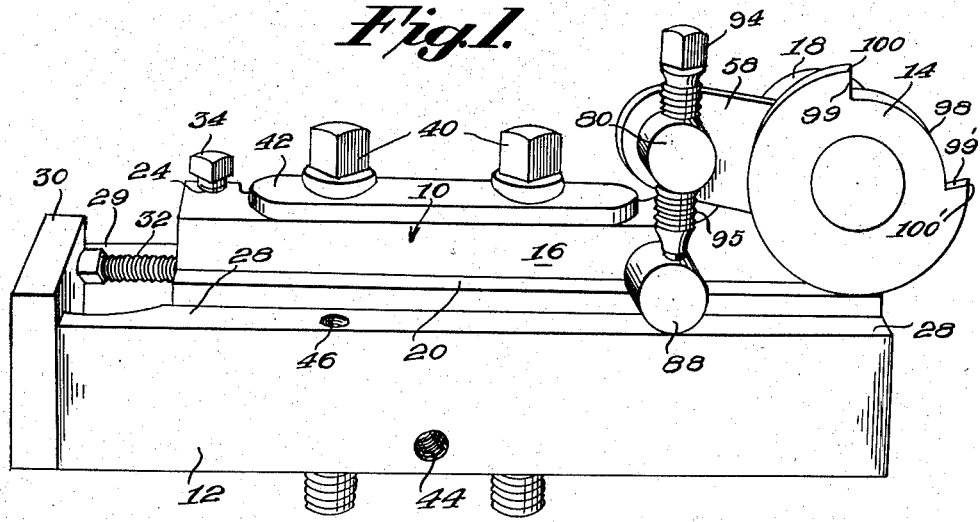
Fig. 1 is a view in perspective of a tool holder and form tool in accordance with the present invention.

Referring now in detail to the drawings, specifically to Fig. 1, a tool holder and tool in accordance with the present invention comprises a tool supporting stock 10 that is adjustably positioned in a bed 12 adapted to be mounted on the carriage (not shown) of a cross-slide of a lathe or the like, said stock 10 adjustably supporting a circular tool, specifically a form tool 14. The stock 10 includes an elongated rectangular base portion 16 having an upstanding tool support portion 18 at one end thereof.

As best shown in Figs. 4 and 5, the base portion 16 is recessed along one side to provide a lateral flange 20 along the full length thereof and on the other side the base portion is recessed along a major portion of its length providing a flange 22 which terminates short of the rear end thereof to accommodate a vertical bore 24 in the rear corner of the base portion 16. A blind bore 26 extends longitudinally and opens through the rear end of the base portion 16, and is in communication with the inner end of the vertical bore 24.

Figure 2:
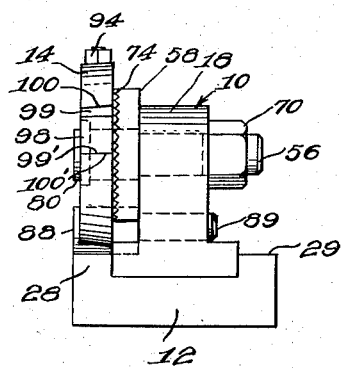
Fig. 2 is an end view in elevation, reduced in size, of the holder and tool shown in Fig. 1.
Figure 3:
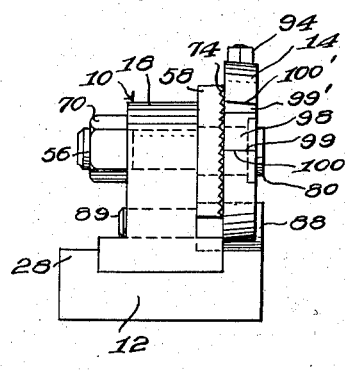
Fig. 3 is an end view in elevation similar to Fig. 2 but with the tool mounted on the opposite side of the holder.

The bed 12 is of channel section, having upstanding arms or flanges 28, 29, as best shown in Figs. 2 and 3, and is open at the front end but closed across the rear end by an end plate 30. The stock 10 is seated in the bed 12 with the flanges 20 and 22 of said stock snugly fitting between the arms 28, 29 of the bed 12. An adjustment screw 32 is threaded in the blind bore 26 for abutment with the bed end plate 30 for positioning the stock relative to the bed, and a set screw 34 is threaded in the vertical bore 24 and engages the adjustment screw 32 for retaining the latter in adjusted position.

The stock 10 and bed 12 are provided with a pair of registering, longitudinal, aligned slots 36 and 38, respectively, (Fig. 4) for the reception of a pair of bolts 40 (Fig. 1) for securing the stock and bed to the carriage of a cross-slide. The bolts 40 are properly spaced for registering with the carriage by a plate 42 having a pair of bolt receiving apertures therein. In addition, the bed 12 has two internally threaded bores extending therethrough, a cross-bore 44 and a vertical bore 46 in the arm 28, for the reception of screw means (not shown) for adjustably positioning the bed 12 relative to the cross-slide carriage.

Figure 8:
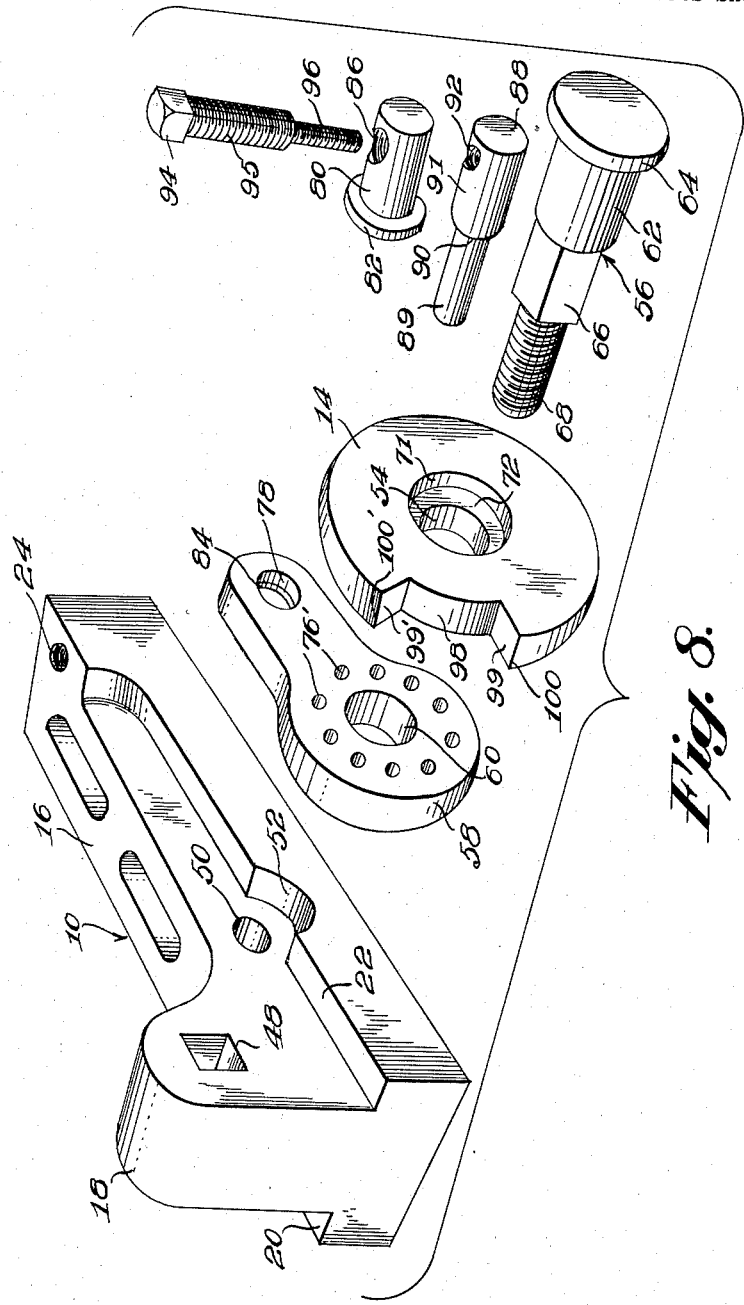
Fig. 8 is an enlarged exploded view of the tool and holder.

The stock support portion 18, as best shown in Fig. 8, is provided with a through cross-bore 48 of square section. The stock base portion 16 is provided with a through cross-bore 50 of cylindrical section and located immediately behind or adjacent the support portion 18 and forward of the bolt slots 36. The stock flanges 20, 22 are each provided with an arcuate notch 52 on a radius from the axis of the cylindrical bore 50 with the bottom of said notches 52 substantially coincident with or tangent to the upper edges of the arms 28, 29 of the bed 12 when the stock is seated in the bed.

The tool 14, as best shown in Figs. 6 and 8, has a centrally positioned cylindrical bore 54 and is mounted on the stock support portion 18 by an arbor 56 inserted in the square bore 48, with an adjustment arm or crank 58, having a bore 60 in one end also mounted on the arbor 56 and in lateral engagement with the tool 14. The arbor 56 has a cylindrical bearing portion 62 at one end with a flange 64 radially of said bearing portion at that end, an intermediate portion 66 of square section for freely but snugly mating with the square cross-bore 48 in the stock support portion 18, and a threaded portion 68 at the other end for receiving a nut 70.

The tool bore 54 and crank arm bore 60 are of uniform diameter which corresponds to that of the arbor cylindrical portion 62, the square portion 66 of the arbor 56 being mounted in the square stock bore 48 and the nut 70 being threaded on the arbor threaded portion 68 and bearing against the side of the stock to sandwich the crank arm 58 and tool 14 between the opposite side of the stock and the arbor flange 64. Preferably, the crank arm 58 is disposed between the stock and the tool, the combined thickness of the arm and the tool preferably being such as to be within the lateral dimensions of the bed 12.

To retain the assembly within the lateral dimensions of the bed 12, the outer of the tool and arm members, the tool in this case, is preferably recessed to accommodate the arbor flange 64. As shown in Fig. 8, the tool 14 is provided with a rabbet or recess 71 around its bore 54 to receive the arbor flange 64 and provide a shoulder 72 for abutment by the arbor flange, as best shown in Fig. 6. Thus, the entire tool assembly, including the crank arm 58, tool 14 and arbor 56, is disposed within the lateral dimensions of the bed 12 as shown in Figs. 2, 3, 4 and 7.

Suitable clutch means is provided between the tool 14 and the crank arm 58 to retain these members in rigid angular relation to each other on the arbor cylindrical portion 62. This clutch means may be of well known structure and comprise a toothed clutch 74, as shown in Figs. 2 and 3, which is constituted of cooperatively meshing annular rings of radially extending teeth. Alternatively, the clutch means may comprise one or more pins, usually a pair of diametrically disposed pins, carried by one member for nesting in sockets in the other member. For example, as indicated in Figs. 5 and 6, a pair of pins 75 may be carried by the crank arm 58 for mating in socket 76 in the tool 14. Conversely, the arm 58 may be provided with sockets 76', as shown in Fig. 8, for receiving pins carried by the tool 14. In either case, the socketed part is provided with a plurality of annularly disposed sockets 76 or 76' to accommodate relative angular juxtapositioning between the tool and the arm.

In the end opposite the bore 60, the crank arm 58 is provided with a bore 78, having an axis parallel to the axis of the bore 60, and a stud 80 is journaled in the bore 78. The stud 80 has a flange 82 at one end and the arm 58 has a rabbet or recess 84 around the bore 78 for nesting the stud flange 80, this recess 84 being in the side of the arm adjacent the stock 10 so that the stud protrudes from the arm at the side opposite the stock. In the end opposite the flange 82, the stud 80 has an internally threaded bore 86 extending diametrically therethrough.

A second stud 88, having an intermediate shoulder 90 and an internally threaded, diametrically extending bore 92 adjacent one end is adapted for insertion in the stock cylindrical bore 50 with the shoulder 90 abutting the side of the stock. The axis of the bore 92 is spaced from the shoulder 90 a distance equal to the spacing of the axis of the bore 78 from the flange end of the stud 80 so that the two bores 78 and 92 may be axially aligned when their respective studs are in operative position. Conveniently, the stud 88 may comprise a portion 89 adapted to be journaled in the stock bore 50 and a portion 91 of larger diameter having the threaded bore 92, the offset between the two portions forming the shoulder 90.

The stud bores 86 and 92 are oppositely threaded with respect to each other and are adapted to receive an adjustment screw 94 having two oppositely threaded portions 95 and 96 adapted respectively for threaded engagement in the bores 86 and 92. The screw 94 has an operating head at its upper end opposite the threaded portion 96 and the threaded portion 96 is of a smaller diameter than the portion 95 to permit free passage through the bore 86 and threading of the portion 95 into said bore 86.

In assembly, the stud 88 has its smaller portion 89 inserted in the stock bore 50, from either side of the stock as the case may be, with its shoulder 90 abutting the side of the stock and its portion 91 accommodated by the notch 52 in the stock flange 20 or 22 and just overlying the arm 28 or 29 of the bed 12. The stud 80 is inserted in the bore 78 of the crank arm 58 with its flange 82 nested in the rabbet 84. The length of the studs 80 and 88 is such that they extend beyond the side of the arm 58 an equal distance but do not extend beyond the side of the bed 12. The screw 94 is then inserted into the bore 86 of the stud 80, the screw portion 96 being passed through the bore and the screw portion 95 being threaded into the bore 86 a substantial, if not its maximum, distance. The studs 80 and 88 are then turned until the screw portion 96 is aligned with the bore 92 in the stud 88 and said screw portion is then threaded into the bore 92. Because of the opposite threading, the threading of the portion 96 into the bore 92 causes a partial unthreading of the portion 95 in the bore 86.

As previously stated, the tool 14 is preferably a form tool and comprises a disc having a notch 98 formed in its periphery. Normally, one end wall 99 of the notch is ground substantially radial of the disc to provide a cutting edge 100 but in the present instance, the notch is provided with a second radial end wall 99' providing a second cutting edge 100'. By this arrangement, the tool can be used on either side of the stock, the edge 100 being used when the tool 14 is on the right side of the stock, as shown in Fig. 3, and the edge 100' being used when the tool 14 is on the left side of the stock, as shown in Fig. 2.

In operation, the tool 14 is first mounted on the arbor 56 and slid onto the cylindrical portion 62, the arbor flange 64 being nested in the rabbet 71 of the tool. The crank arm 58 is then mounted on the arbor 56 and slid onto the cylindrical portion 62. The arbor is then inserted into the square stock bore 48 and the nut 70 is threaded onto the end 68 of the arbor. Before the nut is tightened, the tool 14 and the arm 58 are angularly juxtaposed until the tool edge 100 or 100' to be used and the arm 58 are disposed in substantially opposite directions whereupon the nut 70 is tightened enough to engage the clutch means 74 or 75, 76 between the tool and arm but not enough to clamp the arm tightly against the side of the stock support portion 18.

The portion 89 of the stud 88 is then inserted in the cylindrical stock bore 50 on the same side of the stock as the tool 14 and arm 58, and the stud 80 is inserted through the arm bore 78. The screw 94 is then threaded into the stud bores 86 and 92 as previously described. It will be noted that the screw 94 joins the studs 80 and 88 rigidly and that the flange 82 on the stud 80 prevents removal of the stud 88 from the stock bore 50 while the shoulder 90 of the stud 88, abutting the side of the stock, prevents displacement of the stud 80 from the arm bore 78. Thus, the two studs and the screw mutually cooperate in retaining the assembly in position.

With the parts assembled as described, the screw 94 is then adjusted relative to the studs 80 and 88 to raise or lower the arm 58 so as to turn the tool 14 to properly position the tool edge 100 or 100'. The studs 80 and 88 are free to rotate in their respective bores 78 and 50 and the arm 58 and tool 14 can rotate on the cylindrical arbor portion 62 to accommodate this adjustment. Obviously, the adjustment afforded by the screw 94 is limited and if further adjustment is necessary, the arbor nut 70 is loosened sufficiently to release the clutch means 74 or 75, 76 and the tool 14 is angularly adjusted relative to the arm 58, probably to the next set of sockets 76, 76' if the pin and socket clutch is employed. The nut 70 is then retightened sufficiently to retain the clutch means in engagement and the screw 94 adjusted to properly position the cutting edge of the tool whereupon the nut 70 is securely tightened.

The foregoing arrangement enables the continuous proper adjustment of the tool as the ends 99, 99' of the notch 98 are ground to sharpen the edges 100, 100' and, of course, the double edges 100, 100' of the tool enable both longer use of the tool before regrinding and also a versatility of use in that it can be mounted on either side of the stock. To shift the tool from one side of the stock, it is merely necessary to remove the arbor nut 70, withdraw the arbor 56 and stud 88 from the stock, invert the tool assembly, reinsert the arbor 56 and stud portion 89 into the stock bores 48 and 50 from the other side of the stock, and replace the nut 70.

In addition to the facility of adjustment and universatility of positioning the tool, the present invention has the advantage of reducing torque stresses. In the first place, the torque stresses on the tool 14 are transmitted by the clutch means to the crank arm 58 and are taken up by the studs 80, 88 and screw 94 as well as by frictional engagement with the side of the stock support portion. In the second place, those stresses transmitted to the arbor 56 are taken up by the nesting of the arbor square portion 66 in the square stock bore 48. Thus, the torque stresses are completely compensated.

Although certain specific embodiments of the invention have been shown and described, it is obvious that many modifications thereof are possible. The invention, therefore, is not to be restricted except insofar as is necessitated by the prior art and by the spirit of the appended claims.

That which is claimed as new is:

1. A tool holder for form tools or the like, comprising a stock having two spaced transverse bores, an arbor removably mounted in one of said bores, a tool rotatably mounted on said arbor, a crank arm having a journal rotatably mounted on said arbor and between said stock and said tool, clutch means between said tool and crank arm, said crank arm having an aperture in spaced parallel relation to said journal and with a rabbet surrounding the aperture in the side adjacent said stock, a stud having a flange at one end and being inserted in said aperture from the side of said arm adjacent the stock with said flange nested in the rabbet flush with the side of said crank arm and the opposite end projecting beyond said arm, a second stud removably and rotatably mounted in the other of said stock bores and parallel to the first stud and having an intermediate shoulder abutting the side of said stock adjacent said arm with the free end thereof extending beyond said arm in alignment with the projecting end of the first stud, and a screw threaded transversely through one of said studs and connected to the other stud for adjusting said crank arm and tool angularly about said arbor in fixed and positive relation to the stock, whereby said flange and shoulder react in opposite axial directions and prevent axial displacement of said stud and screw assembly.

2. A tool holder as defined in claim 1, including a channel shaped bed, said stock having a vertically disposed body portion and laterally extending base flanges nested in the channel of the bed, the bores in the stock extending completely through the body portion to receive said arbor and second stud from either side of the vertically disposed body portion; said tool, crank arm, arbor and studs all lying within the lateral confines of the sides of said bed.

References Cited in the file of this patent

UNITED STATES PATENTS

| 79,381 | Newhall | June 30, 1868 |
| 624,490 | Hoffmann | May 9, 1899 |
| 810,238 | Waite | Jan. 16, 1906 |
| 927,527 | Hanson | July 13, 1909 |
| 1,418,983 | Smith | June 6, 1922 |
| 2,346,084 | Sanocki | Apr. 4, 1944 |
| 2,547,789 | Skeel | Apr. 3, 1951 |

FOREIGN PATENTS

| 333,716 | France | Dec. 2, 1903 |